United States Patent [19]

Ludovico

[11] Patent Number: 4,494,501
[45] Date of Patent: Jan. 22, 1985

[54] PISTONS WITH COMBUSTION BOWL INSERTS

[75] Inventor: Bruni Ludovico, Turin, Italy
[73] Assignee: AE PLC, Rugby, England
[21] Appl. No.: 404,416
[22] Filed: Aug. 2, 1982
[30] Foreign Application Priority Data Jul. 31, 1981 [IT] Italy .................. 68088 A/81

[51] Int. Cl.³ .............................................. F01P 1/04
[52] U.S. Cl. ........................... 123/193 CP; 123/193 P; 123/668; 123/669
[58] Field of Search ............ 123/193 P, 193 CP, 668, 123/669, 279

[56] References Cited

U.S. PATENT DOCUMENTS

| 2,513,492 | 7/1950 | Kleinfeld | 123/193 CP |
| 4,018,194 | 4/1977 | Mitchell et al. | 123/41.35 |
| 4,270,494 | 6/1981 | Garter et al. | 123/193 P |

FOREIGN PATENT DOCUMENTS

| 2558763 | 7/1977 | Fed. Rep. of Germany | 123/193 P |
| 203847 | 12/1982 | Japan | 123/193 P |

Primary Examiner—Craig R. Feinberg
Assistant Examiner—David A. Okonsky
Attorney, Agent, or Firm—Leydig, Voit, Osann, Mayer & Holt, Ltd.

[57] ABSTRACT

A piston for an internal combustion engine comprises a piston body of aluminium or aluminium alloy and an insert of a ferrous material having a combustion bowl formed therein. The insert is surrounded by the piston body and the outer surface of the insert and the adjacent surface of the piston body are spaced apart at the crown ends thereof to form an annular gap therebetween which opens onto the crown. This insulates the piston body from the insert.

4 Claims, 4 Drawing Figures

PISTONS WITH COMBUSTION BOWL INSERTS

The invention relates to a piston for an internal combustion engine and comprising a body of aluminium or aluminium alloy and an insert having a combustion bowl formed therein and formed of a heat resistant material having the same or a similar coefficient of expansion as the aluminium or aluminium alloy.

Pistons are provided with such inserts because the insert is better able than the aluminium or aluminium alloy to withstand the temperatures which are encountered in the combustion bowl. The insert has, however, in previously proposed pistons, been in contact with the piston body and this leads to the problem that heat can be conducted from the insert to the piston body, which can thus reach a temperature which damages the piston body. This can limit the working temperature of the piston to temperatures below the maximum sustainable temperature of the insert because at temperatures below this maximum, sufficient heat may be conducted to the piston body to cause the body to reach a temperature at which damage may occur.

It is an object of the invention to overcome these disadvantages.

According to the invention, there is provided a piston for an internal combustion engine and comprising a piston body of aluminium or aluminium alloy and an insert of a ferrous material having a combustion bowl formed therein, the insert being surrounded by the piston body and the outer surface of the insert and an adjacent surface of the piston body being spaced apart at the crown ends thereof to form an annular gap therebetween which opens onto the crown.

It is a further disadvantage of such pistons including inserts that the insert is not always securely held in relation to the piston body and this can lead to problems if the insert becomes loose.

According to a preferred feature of the invention, therefore, the piston body includes two aligned but spaced gudgeon pin bores with the insert including at least one bore extending therethrough, said insert bore having the same diameter as the gudgeon pin bores and being aligned therewith.

The following is a more detailed description of two embodiments of the invention, by way of example, reference being made to the accompanying drawings in which.

Figure 1:
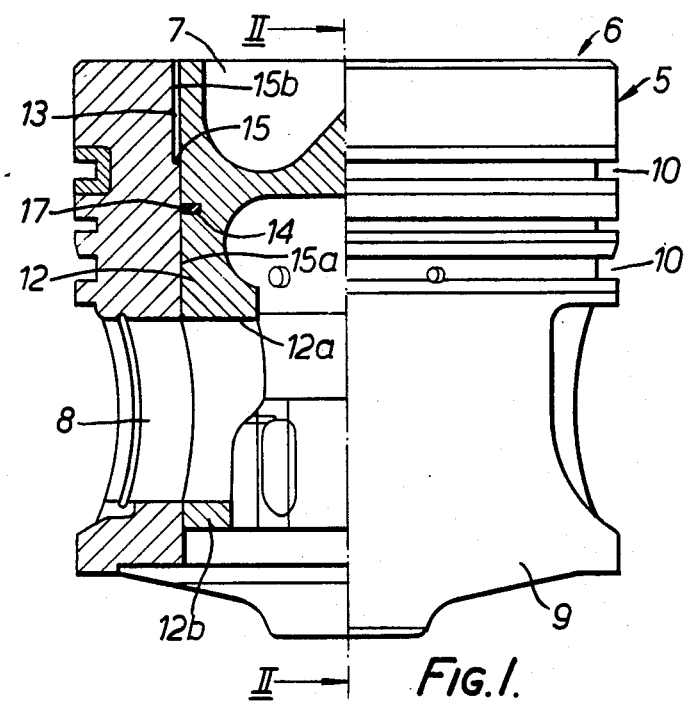
FIG. 1 is an elevation, partly in section, of a first form of piston for an internal combustion engine.
Figure 2:
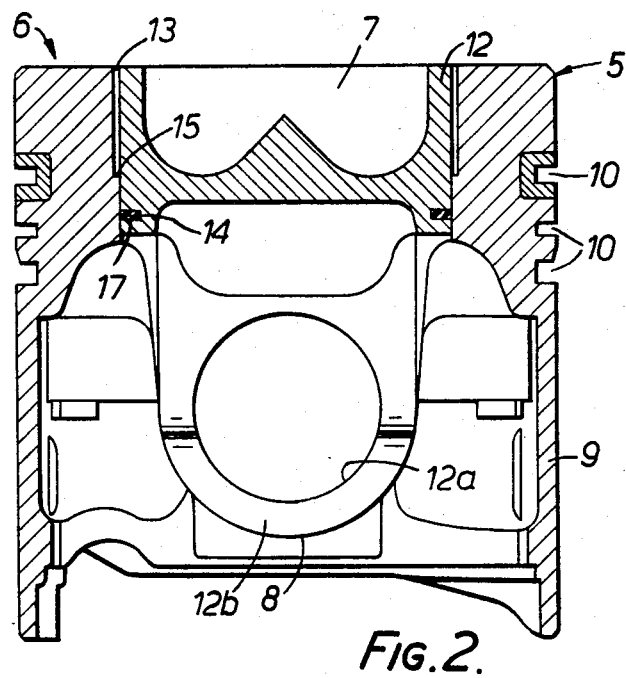
FIG. 2 is a section on the line II—II of FIG. 1.

Referring first to FIGS. 1 and 2, the first form of piston comprises a piston body 5 of aluminium or aluminium alloy and an insert 12. The piston body 5 includes a crown 6 and a ring band formed with grooves 10 for receiving piston rings. Two gudgeon pin bosses 8 are provided in the piston body and form a bore for the receipt of a gudgeon pin. In addition, the piston body 5 is provided with a skirt 9.

The piston body 5 includes a generally cylindrical bore which extends from the crown 6 and includes a reduced diameter section 15a remote from the crown and an increased diameter section 15b adjacent the crown. There is a step 15 between the sections.

The insert 12 has a generally cylindrical outer surface and includes a combustion bowl 7. The insert 12 is an interference fit in the reduced diameter section 15a of the bore in the body portion 5, to hold it firmly in the piston body. The insert 12 is made of austenitic cast iron or steel or similar material which has a coefficient of expansion substantially equal to the coefficient of expansion of the aluminium or aluminium alloy of the piston body.

An annular gap 13 is thus formed between the increased diameter section 15b of the bore and the outer surface of the insert with this gap opening onto the crown 6. The width of the gap 13 may be as little as 0.001 mm or as much as 1 mm.

The purpose of the gap 13 is to insulate the piston body 5 from the insert 12. This reduces the transfer of heat from the crown end of the combustion bowl, which is the hottest part of the piston in use, to the crown end of the piston body which, being of aluminium or aluminium alloy, is not as resistant to the effects of heat as the ferrous material of the insert 12. The likelihood of damage to the piston body in this region is, therefore, reduced. This will also cause the temperature of the insert to rise in comparison with the temperature of the insert of a previously proposed piston with full contact between the insert and the piston body. Further, this will allow the piston to be operated at a higher temperature than the previously proposed piston since the body will reach a temperature at which damage may occur at a higher insert temperature than in the previously proposed piston. Since the gap 13 is open at the crown 6, differential expansion between the piston body 6 and the insert 12 can be accommodated thus reducing strains. Because the gap opens onto the crown, it will, in use, be filled with carbon formed during the combustion process. Since carbon is a good heat insulator, this will further serve to prevent heat passing to the aluminium or aluminium alloy body.

There is a groove 14 around that portion of the outer surface of the insert which is received in the reduced diameter section 15a of the piston body. This groove 14 prevents the passage of combustion gases between the piston body and the insert. A sealing ring 17 may be included in the groove 14.

An end 12b of the insert 12 remote from the crown ends to the gudgeon pin bosses 8 is proved with two bores 12a which are of the same diameter as, and are aligned with, the gudgeon pin bore. Thus, when the gudgeon pin is passed through the gudgeon pin bore, it also passes through the bores 12a in the insert 12. This provides an additional means securing the insert 12 to the piston body 6.

Figure 3:
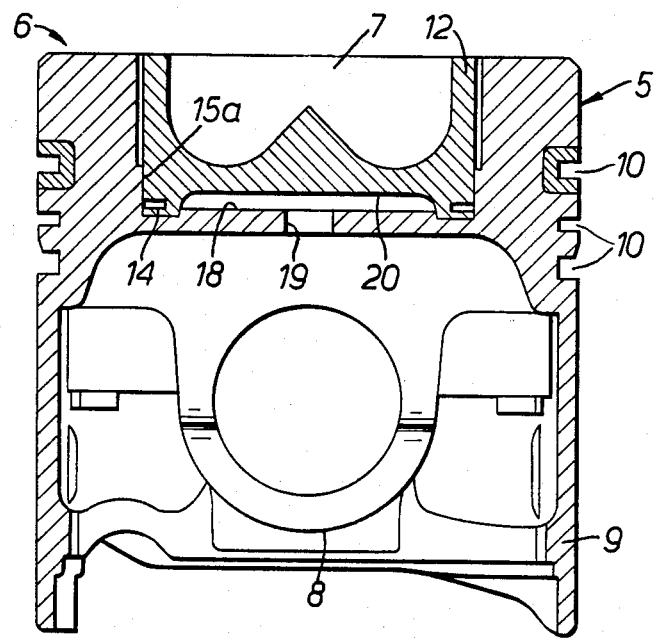
FIG. 3 is a similar view to FIG. 2 but showing a second form of piston for an internal combustion engine.

Referring next to FIG. 3, parts common to FIGS. 1 and 2 and FIG. 3 are given the same reference numerals and will not be described in detail. In FIG. 3, the insert 12 does not include bores aligned with the gudgeon pin bores. Instead, the insert 12 terminates towards the lower end of the reduced diameter portion 15a of the bore in the piston body 6.

The piston body 5 is formed with a cylindrical depression having a base 18 on which the insert 12 rests. The base 18 is provided with a hole 19 for the egress of air from beneath the insert 12 as the insert is interference fitted into the piston body 5. The undersurface of the insert 12 has a central depression 20 so that the major portion of the undersurface is spaced from the piston body 6. Thus, as well as an insulating air gap 13 opening onto the crown, this embodiment also has an insulating air gap between its under surface and the piston body.

Figure 4:
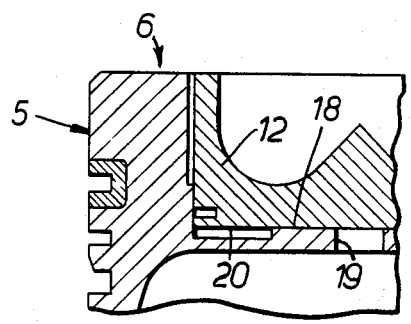
FIG. 4 is a view of a part of the piston of FIG. 3 but showing an alternative form of insert.

In an alternative embodiment, shown in FIG. 4, the depression 20 is around the periphery of the undersurface of the insert 12. Thus, only a central portion of the insert 12 rests on the base 18 of the piston body 5.

The piston of FIGS. 3 and 4 has a reduced weight in comparison with the embodiment of FIGS. 1 and 2. It has been found that even without the attachment of the insert to the gudgeon pin, the insert 12 remains securely fastened to the piston body 5.

The two forms of piston described above with reference to the drawings are efficient in use, and economic to produce.

What is claimed is:

1. A piston for an internal combustion engine comprising:
   a piston body of aluminium or aluminium alloy and having a crown end,
   a generally cylindrical bore formed in the piston body and extending in an axial direction from the crown end, the generally cylindrical bore having a reduced diameter section remote from said crown end and an increased diameter section adjacent said crown end,
   a base formed in the piston body at an innermost end of said generally cylindrical bore,
   an insert of a ferrous material and having a base,
   a combustion bowl formed in the insert,
   said insert having a generally cylindrical outer surface with a uniform diameter which forms an interference fit in the reduced diameter section of the generally cylindrical bore to connect the insert to the piston body,
   a sealing groove between said generally cylindrical outer surface of said insert and said reduced diameter section of said generally cylindrical bore,
   a gap between said generally cylindrical outer surface of said insert and said increased diameter section of said generally cylindrical bore, said gap opening onto said crown end to provide a heat-insulating barrier, and
   a depression formed in the base of the insert and defining, with the base of the generally cylindrical bore, an insulating air gap therebetween, whereby the transfer of heat from the combustion bowl to the piston body is reduced.

2. A piston according to claim 1 wherein the gap has a radial width of between 1 mm and 0.001 mm.

3. A piston according to claim 1, wherein the groove contains a sealing ring.

4. A piston according to claim 1 wherein the insert is made of a substance selected from a group of austenitic cast iron and steel.